No. 630,080. Patented Aug. 1, 1899.
J. J. VOORHEES & W. W. AINSWORTH.
DIE FOR MOLDING RUBBER TUBING.
(Application filed Apr. 5, 1899.)

(No Model.)

Witnesses.
Geo. Wadman
Fred Kemper

Inventors
John J. Voorhees
Warren W. Ainsworth
by Gifford & Bull
Attys.

THE NORRIS PETERS CO., PHOTO-LITHO., WASHINGTON, D. C.

UNITED STATES PATENT OFFICE.

JOHN J. VOORHEES AND WARREN W. AINSWORTH, OF JERSEY CITY, NEW JERSEY; SAID AINSWORTH ASSIGNOR TO SAID VOORHEES.

DIE FOR MOLDING RUBBER TUBING.

SPECIFICATION forming part of Letters Patent No. 630,080, dated August 1, 1899.

Application filed April 5, 1899. Serial No. 711,793. (No model.)

*To all whom it may concern:*

Be it known that we, JOHN J. VOORHEES and WARREN W. AINSWORTH, citizens of the United States, and residents of Jersey City, in the county of Hudson and State of New Jersey, have invented a certain new and useful Improvement which may be Employed in Dies for Molding Rubber Tubing, of which the following is a specification.

Our invention consists of an improvement in machines in which a soft mass, such as rubber, is reduced to desired form by being forced through a die, and is particularly applicable to the manufacture of seamless india-rubber tubing.

Heretofore seamless india-rubber tubing has been found objectionable because of its liability to contain a piece of foreign substance located substantially across the wall, so as to destroy the fluid-proof character of the wall and produce a leak in any article in which the tube may be incorporated or used. This difficulty has led to the use of non-seamless tubing in many cases where seamless tubing would otherwise be desirable, and we believe that our invention is the first means by which seamless tubing can be made without such defect.

In the accompanying drawings we have shown our invention as applied to the die and machine shown in Letters Patent of the United States No. 574,577; but we do not wish to limit ourselves to its application to a die or machine of that form.

Figure 1:
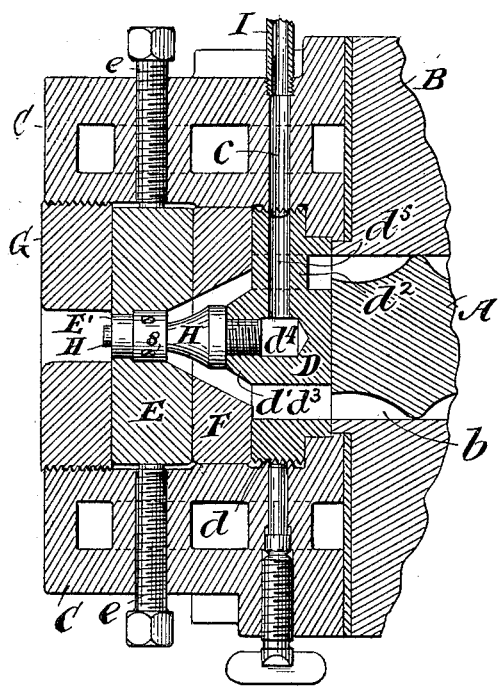
Figure 2:
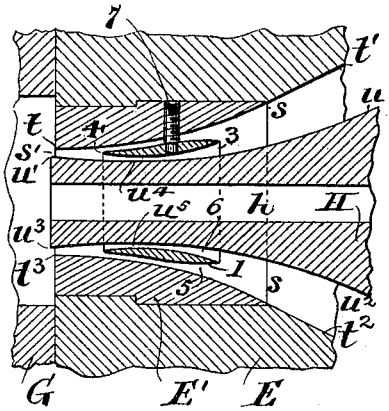
Figure 3:
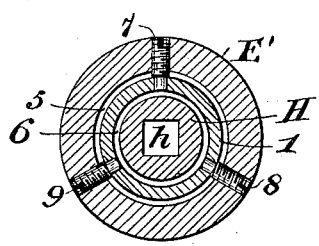

Figure 1 is a vertical longitudinal section of the end of the machine at which the die is located, the die itself, however, being in elevation. Fig. 2 is a full-size central longitudinal section of the die itself and adjacent parts, in which the parts are drawn accurately in measurement and relative position. Fig. 3 is a transverse section of the same.

The pressure screw or plodder for forcing the material to the die is denoted by A and is mounted in any well-known or approved manner within a hollow chamber $b$ of the barrel or casing B.

The end of the machine which carries the die and core is denoted by C and may be secured to the barrel or casing B in any well-known or approved manner, so as to bring its hollow interior in alinement with the hollow chamber $b$, in which the plodder works. Immediately adjacent to the end of the screw or plodder A the core-sustaining piece D is located and is preferably provided with an exterior screw-thread $d$, adapted to register with an interior screw-thread in the end piece C. The piece D is provided with the central hub $d'$, connected with the rim by winding-webs $d^2$, in the present instance three in number, leaving between them and the exterior of the hub winding passage-ways $d^3$ for the material which is to form the tube.

The die E is spaced from the core-sustaining piece D by a spacing block or ring F. The dies E E' are held in their position and centered by means of set-screws $e$ in any well-known or approved manner, and exterior to the die there is located in the end of the piece C an annular nut G, which by screwing into the end of the piece C holds the die and spacing-piece snugly against the core-sustaining piece D.

A core H is screwed into the end of the hub $d'$ of the piece D and projects through the hollow interior of the spacing-ring and through the interior of the die, leaving between its exterior and the interior wall of the die a space gradually tapering from the entrance to the die at $s$ to the exit at $s'$, where it is the thickness which it is intended the wall of the tube shall have.

Within the hub $d'$ of the core-supporting piece D there may be formed a chamber $d^4$, which communicates by a conduit $h$ through the core with the space in its end and by a conduit $d^5$ through one of the ribs $d^2$ of the piece D and a registering conduit $c$ through the piece C with a pipe I, leading to a suitable supply of powdered soapstone or other suitable powdered material. (Not shown.) In the form shown the conduit $h$ extends unobstructedly through to the end of the core, and the form in this particular illustration is that which is adapted to the making of tubes of small diameter.

Thus far the description relates to parts already known in the art, to which we apply our improvement as follows: 1 is an annular separator located in the annular passage through which the plastic material is forced by the plodder. We have shown it in that part of this passage within the die itself, which is the position where we prefer to place it. To provide room for the separator and permit an easy flow of the plastic material by it, we prefer to make the passage $s\ s'$ of the form shown—that is to say, the walls of the die and core are curved longitudinally and gradually approach each other as they approach the exit, so as to gradually thin the passage $s\ s'$; but while the lines $t\ t'$ and $t^2\ t^3$ on the outside of the die-passage converge toward each other all the way to the exit the lines $u\ u'$ and $u^2\ u^3$ on the inside of the die-passage converge toward each other to about the points $u^4$ and $u^5$, opposite the separator, and then preferably diverge from each other to the exit, so that the core is longitudinally concave.

The separator 1 is preferably of metal of the form shown—that is to say, in diameter it decreases from the entrance end 3 to the exit end 4, so as to conform to the general trend of the passage; but its rate of diametrical decrease diminishes as it approaches its exit end, and it practically stops decreasing about opposite the points $u^4$ and $u^5$. The walls of the separator preferably form edges at both ends 3 and 4, and between these edges the walls diverge from each other in curves, as shown, so as to afford the least resistance to the passage of the material consistent with strength and sufficient separation or division of the material.

When the plastic material in the passage $s$ comes against the edge 3 of the separator, it is laminated or split into two annular parts or sheets, one of which parts passes through the passage 5 and the other part through the passage 6. These two parts are brought together again and united in the passage $s'$. Any piece of foreign material in the mass is forced by the separator to pass through either the passage 5 or 6, so that its position is confined to one or the other of the two parts which are united in the passage $s'$ to form the completed annular sheet or wall of the tube. Said piece of foreign material will thus extend at most only half-way through the total sheet or wall of material made by uniting these two parts in the passage $s'$. We have discovered that tubing formed in our machine is not substantially injured by pieces of foreign material.

Any suitable means may be employed for holding the separator in the position shown; but we prefer to hold it by radial screws 7 8 9, connecting it with one of the walls of the passage $s\ s'$. We have shown the screws as connecting it with the outer wall; but this is merely preferable.

In the die shown the width of the exit-opening of the die is about one-sixteenth of an inch and the width of each passage 5 and 6 past the separator is a little more than one thirty-second of an inch, so that the two sheets, parts, or walls of material passing by the separator will when combined receive just enough pressure in the exit to be homogeneously united without forcing the pieces of foreign material of one sheet or part through the other.

We claim—

1. In a machine for forming articles by forcing the material through a die, the combination with the die, of a separator whereby the material is laminated substantially parallel with its faces prior to the final action of the die on it, substantially as described.

2. In a machine for forming articles by forcing the material through an annular passage between a die and a core, the combination with the die and core, of a substantially annular separator in said passage whereby the material is laminated, substantially as described.

3. In a machine for forming articles by forcing the material through between a die and core, the combination with the die and core, of a separator whereby the passage leading to the exit from the die is divided into substantially concentric parts; the acting face of the core being longitudinally concave, substantially as described.

JOHN J. VOORHEES.
WARREN W. AINSWORTH.

Witnesses:
WILLIAM H. SANFORD,
IGNATIUS JUDGE.